United States Patent Office 2,812,588
Patented Nov. 12, 1957

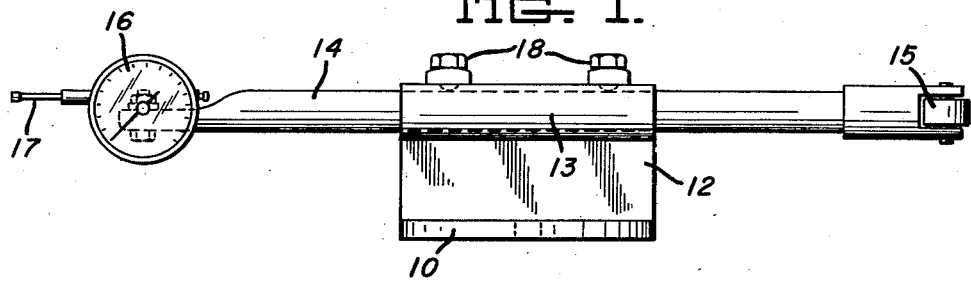
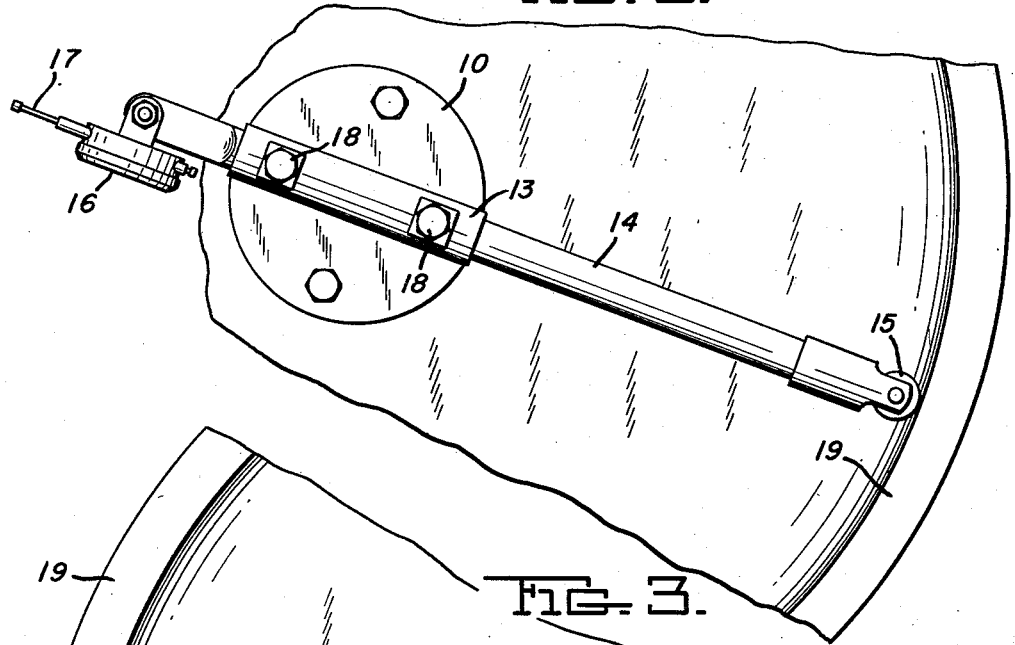
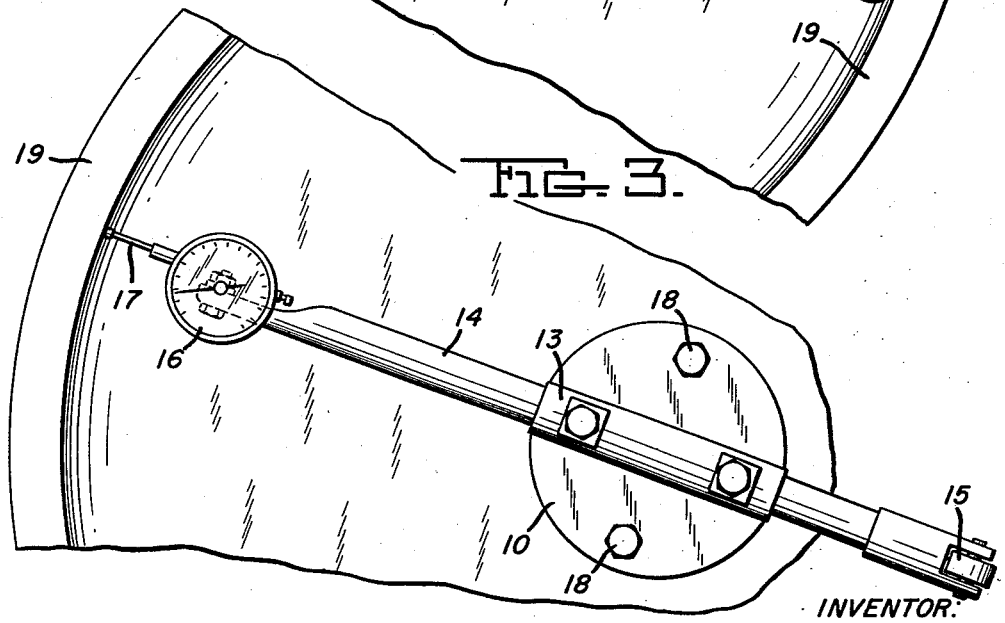

2,812,588
CENTERING GAUGE FOR WHEEL HOUSING

Louis E. Verrant, Keewatin, Minn.

Application April 1, 1955, Serial No. 498,509

3 Claims. (Cl. 33—181)

This invention relates to an improved gauge for aligning a cylindrical housing concentrically with a shaft.

An object of the invention is to provide a single gauge which affords first a rough preliminary indication as to concentricity of the inner circumference of a housing with a shaft and next a final accurate indication.

A more specific object is to provide a gauge of the foregoing type which includes a mounting adapted to be fixed to the end of a shaft and an adjustable radial arm carried by said mounting and having at its respective ends a cam follower adapted to contact a housing for roughly aligning it with the shaft and a dial gauge adapted to contact the housing for finally aligning it.

In accomplishing these and other objects of the invention, I have provided improved details of structure, a preferred form of which is shown in the accompanying drawing, in which:

Figure 1 is a side elevational view of a gauge constructed in accordance with my invention;

Figure 2 is a plan view of the gauge mounted on a shaft and positioned to determine rough alignment of a housing; and Figure 3 is a view similar to Figure 2, but showing the gauge positioned to determine final alignment.

As shown in Figure 1, the gauge includes a mounting plate 10 which carries a fixed upstanding web 12. A guide sleeve 13 is fixed to the upper edge of this web. A radial arm 14 is slidably mounted in the guide sleeve and at its opposite ends carries a cam follower 15 and a dial gauge 16. The dial gauge is a type which has a plunger 17 adapted to contact an interior surface and a dial on which the measurement is read. Set screws 18 are threadedly engaged with the guide sleeve 13 for holding the arm 14 in any position to which it is adjusted.

As shown in Figures 2 and 3, when the gauge is used, the mounting plate 10 is bolted to the end of a shaft, for example the crankshaft of a diesel engine. This plate preferably is circular in outline and of the same diameter as the shaft with which it is used to facilitate thus mounting it accurately. A cylindrical housing 19 is bolted loosely to the frame in which the shaft is journaled. This housing can be for example that which receives the engine flywheel, and it must be concentric with the crankshaft. The arm 14 first is adjusted to a position where its cam follower 15 lies on the circle on which the inner circumference of the housing should lie. The shaft is turned and the housing moved about until the cam surface touches the inner circumference through the full extent of the latter. Next the bolts which hold the housing are tightened somewhat farther and the arm is adjusted radially so that the dial gauge plunger 17 contacts the inner circumference of the housing. The shaft again is turned and the housing moved about until the dial gauge indicates they are accurately aligned. The bolts that hold the housing are then fully tightened and the gauge removed.

From the foregoing description it is seen that the present invention affords a simple gauge for aligning a housing concentrically with a shaft. Only one gauge is needed to obtain both a rough alignment and later an accurate alignment.

While I have shown and described only a single embodiment of my invention, it is apparent that modifications may arise. Therefore, I do not wish to be limited to the disclosure set forth but only by the scope of the appended claims.

I claim:

1. A gauge comprising a mounting plate adapted to be fixed to the end of a shaft, a radial arm supported by said plate for radial adjustment, a cam follower carried by one end of said arm and adapted to contact the inside circumference of a housing for roughly aligning the latter concentrically with the shaft, and a dial gauge carried by the other end of said arm and adapted to contact the inside circumference of the housing for accurately aligning it.

2. A gauge comprising a mounting plate adapted to be fixed to the end of a shaft, a web fixed to said plate, a guide sleeve carried by said web, a radial arm slidably mounted in said sleeve, set screws engaged with said sleeve for fixing the position of said arm, a cam follower carried by one end of said arm and adapted to contact the inside circumference of a housing for roughly aligning the latter concentrically with the shaft, and a dial gauge carried by the other end of said arm and adapted to contact the inside circumference of the housing for accurately aligning it.

3. A gauge as defined in claim 2 in which said plate is of circular outline and of the same diameter as the shaft on which it is adapted to be fixed to facilitate accurate mounting of the gauge.

References Cited in the file of this patent

UNITED STATES PATENTS

| 2,018,550 | Freeman et al. | Oct. 22, 1935 |
| 2,470,635 | Moss | May 17, 1949 |